United States Patent
Seol et al.

(10) Patent No.: US 7,512,091 B2
(45) Date of Patent: Mar. 31, 2009

(54) METHOD OF CONTROLLING REVERSE LINK DATA RATE IN A MOBILE COMMUNICATIONS SYSTEM

(75) Inventors: Jee Woong Seol, Gyeonggi-do (KR); Ki Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 700 days.

(21) Appl. No.: 11/009,893

(22) Filed: Dec. 10, 2004

(65) Prior Publication Data

US 2005/0152308 A1    Jul. 14, 2005

(30) Foreign Application Priority Data

Dec. 10, 2003    (KR)    ............... 10-2003-0089543

(51) Int. Cl.
*H04J 7/02*    (2006.01)
*H04Q 7/00*    (2006.01)

(52) U.S. Cl. .............. 370/328; 370/329; 370/252

(58) Field of Classification Search ............... 370/252, 370/253, 229–236, 310, 328, 329; 455/453, 455/452.1, 452.2, 67.11–67.16
See application file for complete search history.

(56) References Cited

U.S. PATENT DOCUMENTS

| | | | |
|---|---|---|---|
| 6,999,425 B2 * | 2/2006 | Cheng et al. | 370/252 |
| 7,054,275 B2 * | 5/2006 | Kim et al. | 370/252 |
| 7,072,630 B2 * | 7/2006 | Lott et al. | 455/452.2 X |

* cited by examiner

*Primary Examiner*—Philip J Sobutka
(74) *Attorney, Agent, or Firm*—Lee, Hong, Degerman, Kang & Waimey

(57) ABSTRACT

A method for performing reverse link power control by determining the state of a reverse link data rate control bit in a mobile station according to variable thresholds that are set according to the size of a data packet to be transmitted. By considering the size of the data packet to be transmitted when setting the thresholds used to determine the state of the rate control bit, the increased sensitivity at higher data packet sizes of system stability to an incorrect determination of the state of the rate control bit may be accommodated. Furthermore, when a mobile station is located within a soft handoff area, the number of base stations transmitting rate control bits to the mobile station is considered when setting the variable thresholds.

22 Claims, 3 Drawing Sheets

METHOD OF CONTROLLING REVERSE LINK DATA RATE IN A MOBILE COMMUNICATIONS SYSTEM

CROSS-REFERENCE TO RELATED APPLICATIONS

Pursuant to 35 U.S.C. § 119(a), this application claims the benefit of earlier filing date and right of priority to Korean Application No. P2003-89543 filed on Dec. 10, 2003, the contents of which is hereby incorporated by reference herein in its entirety.

BACKGROUND OF THE INVENTION

1. Field of the Invention

The present invention relates to a mobile communications system, and more particularly, to a method for performing reverse link power control by determining the state of a reverse link data rate control bit according to variable thresholds that are set according to the size of a data packet to be transmitted.

2. Description of the Related Art

Mobile communication systems generally provide a reverse link packet data channel via which packet data may be transmitted in a reverse link. The R-PDCH (reverse packet data channel) of the CDMA-2000 system is an example of such a reverse link packet data channel. Transmission at 1.5 Mbps is enabled via R-PDCH. The R-PDCH, the Forward Acknowledgment Channel (F-ACKCH), the Reverse Packet Data Control Channel (R-PDCCH), the Forward Indicator Channel (F-ICCH), the Reverse Request Channel (R-REQCH), and the Forward Grant Channel (F-GCH) are all supported in the CDMA system.

The reverse link data rate in the CDMA system is associated with power control. Power control is a method for enabling uniform reception signal power in order to meet specific performance requirements while decreasing interference with other users. Reverse link power control in the CDMA system may be accomplished by maintaining uniform reception power for a reverse pilot channel (R-PICH).

Specifically, a base station sets a threshold and measures the reception power level of the R-PICH. If the measured level is higher than the threshold, the base station delivers a power control bit (PCB) indicating 'DECREASE' to a mobile station. If the measured level is lower than the threshold, the base station delivers a power control bit indicating 'INCREASE' to the mobile station. The mobile station, having received and determined the state of the power control bit, adjusts the transmission power of its R-PICH.

Power control of data or control channels is performed by enabling other reverse channels to have a uniform ratio with respect to the transmission power level of the R-PICH. In order to maintain a uniform ratio, the transmission power of each of the channels transmitted from the mobile station except the R-PICH is adjusted by utilizing a traffic-to-pilot power ratio (TPR) that is defined as the ratio of transmission power of the corresponding channel to that of the R-PICH. The TPR is a predefined value set to meet the requested performance of the corresponding channel and is determined, for example, based on a data rate, a coding scheme, and a modulation scheme.

The mobile station does not arbitrarily determine the TPR of the R-PDCH. If a specific mobile station arbitrarily uses a high TPR, serious interference with other mobile stations cause the system to become unstable. To prevent such interference, a reverse TPR of the mobile station is adjusted by considering a state of a reverse channel established between the base station and each mobile station.

In conventional methods using rate control as a means of utilizing reverse radio resources, a base station assigns a forward rate control channel (F-RCCH) and transmits a reverse link data rate control bit (RCB) to each mobile station. The RCB may indicate one of two or three possible states, for example an 'INCREASE' state in which a mobile station raises its TPR, a 'DECREASE' state in which a mobile station lowers its TPR, and a 'HOLD' state in which a mobile station maintains its current. TPR.

To determine the TPR of the R-PDCH, a mobile station utilizes a RCB received from a base station and a parameter, such as authorized_TPR, indicating a new TPR to set. FIG. 1 illustrates a variation of the TPR of the R-PDCH according to a conventional data rate control method. A base station transmits an RCB in a specific (ith) frame based on a TPR of a previous ((i-$\beta$)th) frame and a mobile station sets a TPR in a future ((i+$\alpha$)th) frame based on the received RCB. The parameters $\alpha$ and $\beta$ are integers equal to or greater than 1 and represent a time delay in the course of transmission and reception between the base and mobile stations. According to the current cdma2000 standard (Revision D), both $\alpha$ and $\beta$ are set to 2.

When the mobile station receives an RCB via F-RCCH, the authorized_TPR is determined as follows:

1) authorized_TPR=authorized_TPR_past+UP_step[I] (if RCB indicates 'INCREASE')
2) authorized_TPR=authorized_TPR_past+DOWN_step [I] (if RCB indicates 'DOWN')
3) authorized_TPR=authorized_TPR_past (if RCB indicates 'HOLD')

The authorized_TPR parameter indicates a TPR corresponding to a specific data rate index (I). UP_step[I] indicates a TPR increased by one step from 'I'. DOWN_step[I] indicates a TPR decreased by one step from 'I'. The authorized_TPR_past parameter is the previous TPR (authorized_TPR).

A mobile station determines a data rate at which to transmit according to the newly determined TPR (authorized_TPR). The mobile station stores the new TPR value as authorized_TPR_past for use in determining the next TPR (authorized_TPR).

Since the RCB may have three states, the RCB state may be indicated in the following manner when transmitting the RCB from the base station:

1) RCB signal phase set to '−' to indicate 'INCREASE' state
2) RCB signal phase set to '+' to indicate 'DECREASE' state
3) RCB signal is not transmitted to indicate 'HOLD' state.

Utilizing the conventional data rate control method, stability of a system may depend upon the reliability of the RCB transmitted via F-RCCH to a mobile station. If a mobile station incorrectly determines the state indicated by the RCB, for example by determining that the received RCB indicates 'HOLD' state when the base station transmits an RCB indicating 'DECREASE' state, the mobile station may maintain the previously authorized TPR when the TPR should be decreased and unexpected resource utilization may cause the reverse link system to become unstable. Therefore, the thresholds for determining the state ('INCREASE', 'HOLD', or 'DECREASE') of the RCB transmitted from the base station should be set in order to minimize the potential for instability of the system.

FIG. 2 illustrates a conventional method of determining the state of a RCB signal transmitted to a mobile station from a base station. A mobile station determines one of 'INCREASE' state, 'DECREASE' state, and 'HOLD' state utilizing a first threshold value (TH_τ) for an RCB reception signal size and a second threshold value (TH_θ) for an RCB reception signal phase.

If the RCB reception signal size is smaller than the first threshold (TH_τ), the mobile station determines that a received RCB signal indicates 'HOLD' state. If the reception signal size is greater than the first threshold (TH_τ) and the reception signal phase lies between the inverse of the second threshold (−TH_θ) and 180° added to the second threshold (180°+TH_θ), the mobile station determines that the received RCB signal indicates 'INCREASE' state. If the reception signal size is greater than the first threshold (TH_τ) and the reception signal phase lies between 180° added to the second threshold (180°+TH_θ) and the second threshold subtracted from 360° (360°−TH_θ), the mobile station determines that the received RCB signal indicates 'DECREASE' state.

When setting the first (TH_τ) and second (TH_θ) thresholds for determining the state of the RCB, the mobile station considers a "missing probability" and "false alarm probability". The "missing probability" is the probability of incorrectly determining an RCB transmitted by the base station to indicate 'INCREASE' state as indicating 'HOLD' state or 'DECREASE' state. The "false alarm probability" is the probability of determining an RCB transmitted by the base station to indicate 'DECREASE' state as indicating 'HOLD' or 'INCREASE' state.

Generally, for system stabilization, it is preferable that the first (TH_τ) and second (TH_θ) thresholds are set to have a small "false alarm probability" since the mobile station incorrectly increasing or maintaining the data rate due to an incorrect determination when the data rate should be decreased ("false alarm") has a greater affect on system stabilization than the mobile station incorrectly decreasing the data rate due to an incorrect determination when the data rate should be maintained or increased ("missing"). However, if the "false alarm probability" is set too small, the "missing probability" is increased, thereby making it more likely that the mobile station will incorrectly determine the state of an RCB indicating 'INCREASE' state for which the TPR should be increased and this possibility should be considered when setting the first and second thresholds.

Table 1 illustrates a reference value (normal_TPR) according to the size (EP_SIZE) of encoder packet that is to be transmitted in the physical channel according to the current CDMA standard. As illustrated in Table 1, as the size (EP_SIZE) of the encoder packet increases, the higher the transmission power is increased and the greater the difference between sections becomes. Generally, as the size (EP_SIZE) of the encoder packet increases, the greater the effect on the stability of the system that an incorrect determination of the state of an RCB transmitted from the base station to a mobile station has.

However, in conventional methods, the first (TH_τ) and second (TH_θ) thresholds are set constant regardless of the size (EP_SIZE) of the encoder packet to be transmitted. Therefore, the greater sensitivity of the system to an incorrect determination of the RCB signal state by a mobile terminal is not taken into consideration.

TABLE 1

| | | (Pilot Power = 0 dB) | | |
|---|---|---|---|---|
| Row I | EP_SIZE | normal_TPR [dB] | Power [Watt] | Difference [Watt] |
| 1 | 192 | 0.75 | 1.18 | |
| 2 | 408 | 3.75 | 2.37 | 1.19 |
| 3 | 792 | 6.75 | 4.73 | 2.36 |
| 4 | 1560 | 9.625 | 9.17 | 4.44 |
| 5 | 3096 | 11.875 | 15.4 | 6.23 |
| 6 | 4632 | 13.625 | 23.04 | 7.64 |
| 7 | 6168 | 14.875 | 30.73 | 7.69 |
| 8 | 9240 | 16.625 | 45.97 | 15.24 |
| 9 | 12312 | 18 | 63.01 | 17.04 |
| 10 | 15384 | 19.125 | 81.75 | 18.74 |

Therefore, there is a need for a method of determining the state of an RCB signal that minimizes the effect that the size of a data packet to be transmitted has on the sensitivity of system stability to incorrect determinations of the RCB state by a mobile station. The present invention addresses these and other needs.

SUMMARY OF THE INVENTION

The present invention is directed to a method for performing reverse link power control by determining the state of a reverse link data rate control bit according to variable thresholds that are set according to the size of a data packet to be transmitted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for determining the state of a reverse link data rate control bit received in a mobile station. Specifically, variable thresholds are utilized to determine the state of the data rate control bit, the thresholds set according to the size of a data packet that is to be transmitted.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one aspect of the invention, a method is provided for controlling a reverse link data rate in a mobile communication device. The method includes receiving a reverse link data rate control bit indicating a state related to varying a traffic-to-pilot power ratio (TPR) of a transmission channel, determining the state of the reverse link data rate control bit by utilizing a first threshold for determining the size of the signal and a second threshold for determining the phase of the signal, and setting a rate for transmitting packet data on the transmission channel based on the determined state of the reverse link data rate control bit. The data rate control bit has at least two possible states; a state in which the TPR is increased and a state in which the TPR is decreased, with the increase or decrease in the TPR accomplished by varying the data rate of the transmission channel. The first threshold and second threshold are set according to the size of the data packet to be transmitted.

In one embodiment of the invention, the data rate control bit has three possible states; a state in which the TPR is increased, a state in which the TPR is decreased and a state in which the TPR is maintained at the current value. The thresholds utilized to determine the state of the data rate control bit are preferably set such that the larger the size of the data packet to be transmitted, the lower the probability that the state of the data rate control bit is incorrectly determined to increase or maintain the TPR when the TPR should be decreased.

It is contemplated that, when the thresholds are set, current state prediction information of a forward channel may be considered. Preferably, the forward channel is a forward pilot channel.

It is contemplated that the thresholds may be determined according to a predicted size and phase of the data rate control bit signal and an weight assigned to the probability of incorrect determination of the rate control bit state. The weights preferably are set in inverse proportion to the size of the data packet to be transmitted.

It is contemplated that the predicted size and phase of the data rate control bit signal may be determined by performing normalization during a predetermined window based on a signal level of a forward pilot channel, such as F-PICH, received each frame. Preferably, information related to signals previously received on the channel is considered when making the determination.

It is contemplated that the predicted size and phase of the data rate control bit signal may be determined by further considering a size and phase of a signal level of the rate control bit upon receiving a NAK. Preferably, the signal level of a rate control bit received on F-RCCH and ratios related to the use of the F-PICH and F-RCCH channels are considered when making the determination.

It is contemplated that the thresholds may be set by further considering the number of base stations transmitting rate control bits to a mobile station located within a soft handoff area. It is further contemplated that considerations related to threshold determination may be made that are similar to those when the mobile terminal is not located within a soft handoff area. For example, current state prediction information of a forward channel, predicted size and phase of the data rate control bit signal, normalization during a predetermined window based on a signal level of a forward pilot channel, and a size and phase of a signal level of the rate control bit upon receiving a NAK all may be considered when setting the thresholds.

In another embodiment of the invention, the data rate control bit has two possible states; a state in which the TPR is increased and a state in which the TPR is decreased. The thresholds utilized to determine the state of the data rate control bit are preferably set such that the larger the size of the data packet to be transmitted, the lower the probability that the state of the data rate control bit is incorrectly determined to increase the TPR when the TPR should be decreased.

It is contemplated that the thresholds may be set by further considering the number of base stations transmitting rate control bits to a mobile station located within a soft handoff area. It is further contemplated that, when the thresholds are set, current state prediction information of a forward channel may be considered both when the mobile station is located within a soft handoff area and when the mobile station is not located within a soft handoff area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method for performing reverse link power control by determining the state of a reverse link data rate control bit according to variable thresholds that are set according to the size of a data packet to be transmitted. Although the present invention is illustrated with respect to a method of controlling reverse link data rate in a system in which a 3-state data rate control bit is transmitted to a mobile station, the present invention may be utilized in systems in which a data rate control bit having any number of possible states is transmitted.

Reference will now be made in detail to the preferred embodiments of the present invention, examples of which are illustrated in the accompanying drawings. Wherever possible, the same reference numbers will be used throughout the drawings to refer to the same or like parts.

Figure 3:
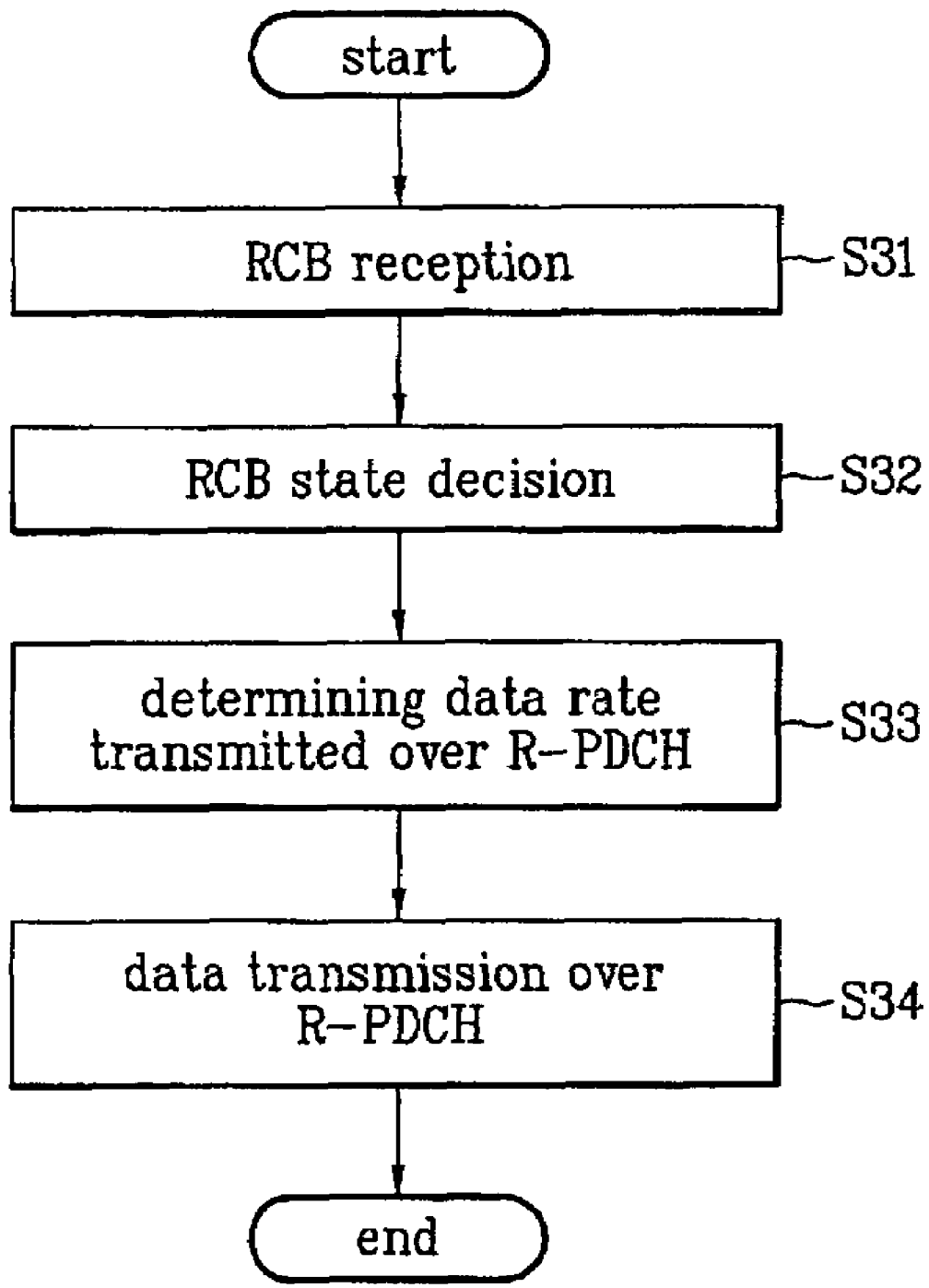
FIG. 3 illustrates a flowchart of a method for controlling reverse link data rate according to one embodiment of the present invention.

FIG. 3 illustrates a flowchart of a method 30 for controlling reverse link data rate according to one embodiment of the present invention. A mobile station receives an RCB transmitted from a base station to control the data rate of packet data transmitted over R-PDCH (S31). The mobile station utilizes the size and phase of the RCB signal to determine the state of the received RCB.

The mobile station determines the state of the RCB by comparing the size of the RCB signal to a first threshold (TH_$\tau$) and comparing the phase of the RCB signal to a second threshold (TH_$\theta$) (S32). The state of the RCB is determined as 'INCREASE', 'HOLD' or 'DECREASE'.

Once the state of the RCB is determined, the data rate of the packet data transmitted over the R-PDCH is set based on the determined state (S33). Specifically, a new TPR (authorized_TPR) is determined according to the determined state of the RCB and the data rate is set within a limit of the new TPR (authorized_TPR).

Once the data rate is set, the mobile station transmits a packet data over the R-PDCH at the determined data rate (S34). The method is performed for each RCB received.

The present invention determines the state of the RCB in steps S32 of FIG. 3 in a different manner than conventional methods. By utilizing variable first (TH_τ) and second (TH_θ) thresholds, the probability of an incorrect determination by the mobile station may be adjusted according to the size of the data packet that is to be transmitted.

Unlike conventional methods, which utilize the same first (TH_τ) and second (TH_θ) thresholds for each data packet size (EP_SIZE) and therefore, have the same "missing probability" and "false alarm probability," the method of the present invention considers the effect that EP_SIZE has on the sensitivity of the system to an incorrect determination of the RCB state by a mobile station. The first (TH_τ) and second (TH_θ) thresholds are set such that each EP_SIZE has a corresponding "missing probability" and "false alarm probability." Specifically, a lower "false alarm probability" is provided for greater EP_SIZE.

Preferably when setting the first (TH_τ) and second (TH_θ) thresholds, current state prediction information of a reception signal level over a forward channel is considered as well as EP_SIZE. For example, the first (TH_τ) and second (TH_θ) thresholds may be set according to the following equations:

$$TH\_\tau = \Delta_\tau(a) \cdot channel\_\tau \quad [1]$$

$$TH\_\theta = \Delta_\theta(a) + channel\_\theta \quad [2]$$

In Equation 1 and Equation 2, channel_τ is current state prediction information of a size of a reception signal over a forward channel and channel_θ is current state prediction information of a phase of a reception signal over the forward channel. Furthermore, $\Delta_\tau(a)$ and $\Delta_\theta(a)$ are a weight set for false alarm probability in inverse proportion to EP_SIZE. Moreover, 'a' is an indication of EP_SIZE.

Figure 1:
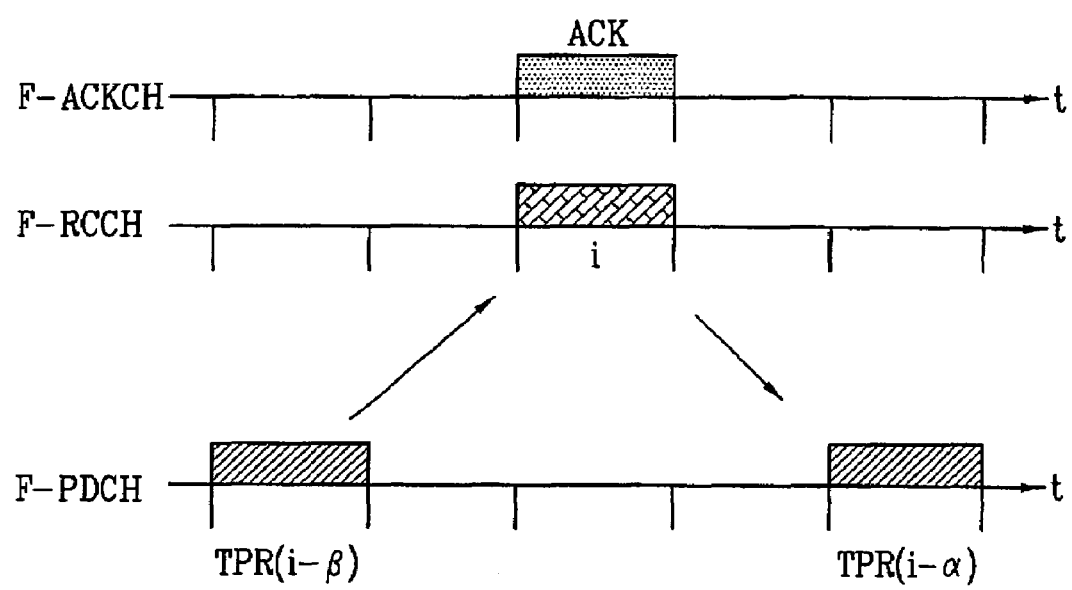
FIG. 1 illustrates the setting of the TPR of R-PDCH according to a conventional data rate control method.
Figure 2:
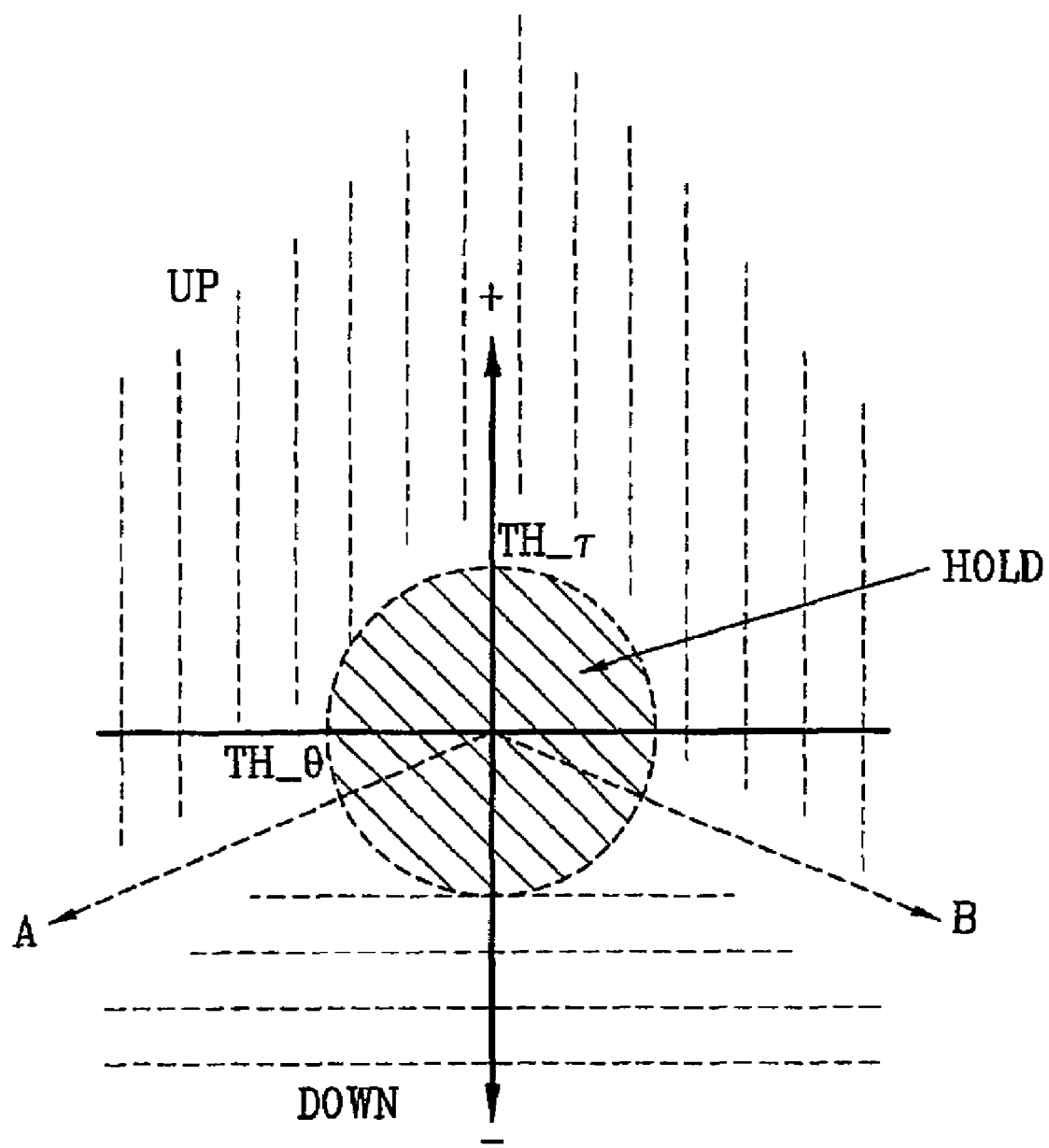
FIG. 2 illustrates a conventional method for determining the state of an RCB signal transmitted from a base station to a mobile station.

The basis of the TPR variation is 'a', which indicates the size (EP_SIZE) of the (i-β)th packet transmitted in FIG. 1. The base station performs the data rate control algorithm based on the (i-β)th packet.

The current state prediction information of the reception signal level over the forward channel, channel_τ and channel_θ, are preferably predicted based on the F-PICH (Forward Pilot Channel). Since the transmission power of F-PICH is fixed, the corresponding channel status may be predicted with reference to a R-PICH reception signal level at the mobile station. Furthermore, a mobile station may estimate a channel by windowing during a prescribed section, as expressed by the following equations:

$$channel(r,\delta) = channel\_r \angle channel\_\delta \quad [3]$$

$$ins\_channel(r,\delta) = ins\_channel\_r \angle ins\_channel\_\delta \quad [4]$$

$$channel\_\tau = (1 - 1/window\_size) \cdot channel\_r + 1/window\_size \cdot ins\_channel\_r \quad [5]$$

$$channel\_\theta = (1 - 1/window\_size) \cdot channel\_\delta + 1/window\_size \cdot ins\_channel\_\delta \quad [6]$$

In Equations 3-6, window_size is a size of a setup window, channel(r,δ) is previous channel information, and ins_channel(r,δ) is a reception signal level of F-PICH received each moment. In determining the current state prediction information of the reception signal level over the forward channel, the reception level of the RCB of F-RCCH may be further considered if the mobile station receives a NAK signal.

Specifically, in transmitting the RCB to the mobile station, the base station sends NAK information via F-ACKCH if a decoding error occurs in a received packet and transmits an RCB indicating 'HOLD' state via F-RCCH. To indicate the 'HOLD' state, no signal is transmitted. Therefore, from the viewpoint of a mobile station, the received NAK signal may help in predicting a current forward channel with reference to the signal level (rcb_hold(τ,θ)) of a received RCB on the F-RCCH. The values of rcb_hold(τ,θ) and channel(τ,θ) may be determined by the following equations:

$$rcb\_hold\_\tau = (1 - 1/window\_hold) \cdot rcb\_hold\_r + 1/window\_hold \cdot ins\_rcb\_hold\_r \quad [7]$$

$$rcb\_hold\_\theta = (1 - 1/window\_hold) \cdot rcb\_hold\_\delta + 1/window\_hold \cdot ins\_rcb\_hold\_\delta \quad [8]$$

$$channel(\tau,\theta) = p \cdot channel(\tau,\theta) + q \cdot rcb\_hold(\tau,\theta) \quad [9]$$

In Equations 7-9, window_hold is a size of a window set during a prescribed frame of the RCB transmission channel, rcb_hold(r,δ) is an RCB received on the F-RCCH if a previously calculated NAK signal is received, ins_rcb_hold(τ,δ) is signal level information of the NAK received each moment, p is a use ratio of channel(τ,θ) and q is a use ratio of rcb_hold(τ,θ).

If a mobile station is located within a soft handoff area and receives RCBs from several base stations, the mobile station combines the RCBs according to a rate-combining rule to determine a new TPR (authorized_TPR) of the R-PDCH. The rate combining rule is an 'increase-or-decrease' rule if common rate control is utilized and a rule that assigns a higher priority to a DECREASE command from a non-serving base station than a command from a serving base station if dedicated rate control is utilized.

The basic principle of the rate-combining rule is that the data rate is not arbitrarily increased to secure system stability. Therefore, when a mobile station is located within a soft handoff area, "missing probability" and "false alarm probability" are considered slightly differently.

Variables $\Delta_\tau(a)$ and $\Delta_\theta(a)$ are replaced by $\Delta_\tau(a,s)$ and $\Delta_\theta(a,s)$, respectively, such that the first (TH_τ) and second (TH_θ) thresholds may be set according to the following equations:

$$TH\_\tau = \Delta_\tau(a,s) \cdot channel\_\tau \quad [10]$$

$$TH\_\tau = \Delta_\tau(a,s) \cdot channel\_\tau \quad [11]$$

In Equation 10 and Equation 11, channel_τ is current state prediction information of a size of a reception signal over a forward channel and channel_θ is current state prediction information of a phase of a reception signal over the forward channel. Furthermore, $\Delta_\tau(a,s)$ and $\Delta_\theta(a,s)$ are a weight set according to EP_SIZE and the number of base stations transmitting RCBs to a mobile station.

A mobile station in a handoff region recognizes the number of base stations to which it is currently connected, combines RCBs transmitted from the base stations, and then determines a final RCB state. The process requires the mobile station determine the state of the RCB transmitted from each base station by comparing a reception level (amplitude, phase) of each RCB to predefined first (TH_τ) and second (TH_θ) thresholds.

Once the state of each RCB is determined, the mobile station combines the corresponding values to decide a final RCB state. If the state of even one RCB transmitted from one base station is determined incorrectly, the state determination of the final RCB may be affected. Therefore, it is preferable that the first (TH_τ) and second (TH_θ) thresholds utilized to determine the state of each RCB transmitted from each of the base stations are set according to the number of the base stations connected to the mobile station. Specifically, the first (TH_τ) and second (TH_θ) thresholds are set in order to decrease the "false alarm probability" if the number of the base stations connected to the mobile station increases.

If a mobile station is located within a handoff area, Equations 3-9 may be used to determine the state prediction information of the forward channel if the mobile station receives a NAK signal. Equations 3-9 take into account channel information, for example (instance_value), of the F-PICH and the reception level of the RCB of the F-RCCH.

As disclosed herein, the present invention is applied to a method for controlling the reverse link data rate utilizing a data rate control bit (RCB) having three possible states. However, the method of the present invention may be applied to a method for controlling a reverse link data rate that utilizes an RCB having two possible states; 'INCREASE' and 'DECREASE'.

Accordingly, to determine the state of the reverse link data rate control bit utilizing the method of the present invention, the thresholds applied to the RCB signal level are variably set to provide a "missing probability" and "false alarm probability" according to the size of the data packet to be transmitted. Therefore, the present invention minimizes the effect on system stability due to an incorrect determination of the RCB state by a mobile station and thereby enhances system performance.

It will be apparent to those skilled in the art that various modifications and variations can be made in the present invention. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of controlling a reverse link data rate in a mobile communication device, the method comprising:
   receiving a reverse link data rate control bit signal indicating a state related to varying a traffic-to-pilot ratio (TPR) of a transmission channel, the possible states comprising at least an 'INCREASE' state and a 'DECREASE' state;
   determining the state of the reverse link data rate control bit signal by utilizing a first threshold for determining the size of the data rate control bit signal and a second threshold for determining the phase of the data rate control bit signal; and
   setting a rate for transmitting packet data on the transmission channel based on the determined state of the reverse link data rate control bit signal,
   wherein the first threshold and second threshold are set according to the size of the packet data.

2. The method of claim 1, wherein the possible states of data rate control bit signal are 'INCREASE' state, 'DECREASE' state and 'HOLD' state.

3. The method of claim 2, wherein the first threshold and second threshold are set such that the probability of incorrectly determining the 'DECREASE' state of the data rate control bit signal as one of 'INCREASE' state and 'HOLD' state is inversely proportional to the size of the packet data.

4. The method of claim 3, wherein the first threshold and second threshold are set by further considering current state prediction information of a forward channel.

5. The method of claim 4, wherein the forward channel is a forward pilot channel.

6. The method of claim 4, wherein the first threshold is determined by the equation $\Delta_\tau(a)\cdot\text{channel}\_\sigma$ and the second threshold is determined by the equation $\Delta_\theta(a)+\text{channel}\_\theta$ wherein:
   channel_$\sigma$ is the predicted size of the data rate control bit signal received on the forward channel,
   channel_$\theta$ is the predicted phase of the current data rate control bit signal received on the forward channel,
   $\Delta_\tau(a)$ and $\Delta_\theta(a)$ are weights set for false alarm probability in inverse proportion to the size of an encoder packet, and
   'a' is the size of the encoder packet.

7. The method of claim 6, wherein channel($\tau,\theta$) is determined by performing normalization during a predefined window based on a signal level of a forward pilot channel received each frame.

8. The method of claim 7, wherein channel($\tau,\theta$) is determined by the equations channel_$\tau$=(1−1/window_size)·channel_$r$+ 1/window_size·ins_channel_$r$ and channel_$\theta$=(1−1/window_size)·channel_$\delta$+ 1/window_size·ins_channel_$\delta$, and wherein:
   window_size is the size of a setup window,
   channel($r,\delta$) is previous channel information, and
   ins_channel($r,\delta$) is a signal level of a forward pilot channel received each frame.

9. The method of claim 6, wherein channel($\tau,\theta$) is determined by further considering a signal level of the rate control bit signal upon receiving a NAK, the signal level comprising a size and a phase.

10. The method of claim 9, wherein the size of the data rate control bit signal (rcb_hold_$\tau$) is determined by the equation rcb_hold_$\tau$=(1−1/window_hold)·rcb_hold_$r$+ 1/window_hold·ins_rcb_hold_$r$, the phase of the data rate control bit signal (rcb_hold_$\theta$) is determined by the equation rcb_hold_$\theta$=(1−1/window_hold)·rcb_hold_$\delta$+ 1/window_hold·ins_rcb_hold_$\delta$, and channel($\tau,\theta$) is determined by the equation p·channel($\tau,\theta$)+q·rcb_hold($\tau,\theta$), and wherein:
    window_hold is the size of a window set during a prescribed section of the rate control bit transmission channel,
    rcb_hold($r,\delta$) is a rate control bit signal received on F-RCCH when receiving a previously calculated NAK signal,
    ins_rcb_hold($\tau,\theta$) is signal level information received each frame when receiving NAK,
    p is a use ratio of channel($\tau,\theta$), and
    q is a use ratio of rcb_hold($\tau,\theta$).

11. The method of claim 3, wherein the first threshold and second threshold are set by further considering a number of base stations transmitting rate control bits to the mobile station if the mobile station is located within a soft handoff area.

12. The method of claim 11, wherein the first threshold and second threshold are set by further considering current state prediction information of a forward channel.

13. The method of claim 12, wherein the first threshold is determined by the equation $\Delta_\tau(a,s) \cdot \text{channel\_}\tau$ and the second threshold is determined by the equation $\Delta_\theta(a,s) \cdot \text{channel\_}\theta$ and wherein:
channel_$\tau$ is the predicted size of the current data rate control bit signal received on the forward channel,
channel_$\theta$ is the predicted phase of the current data rate control bit signal received on the forward channel, and
$\Delta_\tau(a,s)$ and $\Delta_\theta(a,s)$ are weights set according to the size of the packet data and a number of base stations transmitting rate control bits to the mobile station.

14. The method of claim 13, wherein channel($\tau,\theta$) is determined by performing normalization during a predefined window based on a signal level of a forward pilot channel received each frame.

15. The method of claim 14, wherein channel($\tau,\theta$) is determined by the equations $$\text{channel\_}\tau = (1 - 1/\text{window\_size}) \cdot \text{channel\_}r + 1/\text{window\_size} \cdot \text{ins\_channel\_}r$$

and, $$\text{channel\_}\theta = (1 - 1/\text{window\_size}) \cdot \text{channel\_}\delta + 1/\text{window\_size} \cdot \text{ins\_channel\_}\delta,$$

and wherein:
window_size is the size of a setup window,
channel(r,$\delta$) is previous channel information, and
ins_channel(r,$\delta$) is a signal level of a forward pilot channel received each frame.

16. The method of claim 13, wherein channel($\tau,\theta$) is determined by additionally considering a signal level of the rate control bit signal upon receiving a NAK, the reception level comprising a size and a phase.

17. The method of claim 16, wherein the size of the data rate control bit signal (rcb_hold_$\tau$) is determined by the equation $$\text{rcb\_hold\_}\tau = (1 - 1/\text{window\_hold}) \cdot \text{rcb\_hold\_}r + 1/\text{window\_hold} \cdot \text{ins\_rcb\_hold\_}r,$$

the phase of the data rate control bit signal (rcb_hold_$\theta$) is determined by the equation $$\text{rcb\_hold\_}\theta = (1 - 1/\text{window\_hold}) \cdot \text{rcb\_hold\_}\delta + 1/\text{window\_hold} \cdot \text{ins\_rcb\_hold\_}\delta,$$

and channel($\tau,\theta$) is determined by the equation $$\text{channel}(\tau,\theta) = p \cdot \text{channel}(\tau,\theta) + q \cdot \text{rcb\_hold}(\tau,\theta),$$

and wherein:
window_hold is the size of a window set during a prescribed section of the rate control bit transmission channel,
rcb_hold(r,$\delta$) is a rate control bit signal received on F-RCCH when receiving a previously calculated NAK signal,
ins_rcb_hold($\tau,\delta$) is signal level information received each frame when receiving NAK,
p is a use ratio of channel($\tau,\theta$), and
q is a use ratio of rcb_hold($\tau,\theta$).

18. The method of claim 1, wherein the possible states of the data rate control bit signal are 'INCREASE' state and 'DECREASE' state.

19. The method of claim 18, wherein the first threshold and second threshold are set such that the probability of incorrectly determining the 'DECREASE' state of the data rate control bit signal as 'INCREASE' state is inversely proportional to the size of the packet data.

20. The method of claim 19, wherein the first threshold and second threshold are set by further considering current stats prediction information of a forward channel.

21. The method of claim 19, wherein the first threshold and second threshold are set by further considering a number of base stations transmitting rate control bits to the mobile station if the mobile station is located within a soft handoff area.

22. The method of claim 21, wherein the first threshold and second threshold are set by further considering current state prediction information of a forward channel.

* * * * *